(12) United States Patent
Yamamoto et al.

(10) Patent No.: US 7,915,337 B2
(45) Date of Patent: Mar. 29, 2011

(54) SURFACE-TREATING AGENT COMPRISING FLUOROPOLYMER

(75) Inventors: Ikuo Yamamoto, Settsu (JP); Tetsuya Masutani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1000 days.

(21) Appl. No.: 10/555,185

(22) PCT Filed: Apr. 27, 2004

(86) PCT No.: PCT/JP2004/006056
§ 371 (c)(1),
(2), (4) Date: Nov. 1, 2005

(87) PCT Pub. No.: WO2004/096939
PCT Pub. Date: Nov. 11, 2004

(65) Prior Publication Data
US 2006/0205864 A1    Sep. 14, 2006

(30) Foreign Application Priority Data

May 2, 2003 (JP) ................................. 2003-126992
Feb. 10, 2004 (JP) ................................. 2004-033669

(51) Int. Cl.
*C08L 27/12* (2006.01)
(52) U.S. Cl. ........ 524/544; 524/556; 526/240; 526/242; 526/243
(58) Field of Classification Search ................. 524/544, 524/556; 526/240, 242, 243
See application file for complete search history.

(56) References Cited

U.S. PATENT DOCUMENTS

| | | | | |
|---|---|---|---|---|
| 4,366,300 A | * | 12/1982 | Delescluse | 526/245 |
| 4,592,930 A | * | 6/1986 | Schmidt et al. | 427/133 |
| 5,021,501 A | * | 6/1991 | Ohmori et al. | 524/544 |
| 5,128,389 A | * | 7/1992 | Inukai et al. | 522/172 |
| 6,037,429 A | * | 3/2000 | Linert et al. | 526/243 |

FOREIGN PATENT DOCUMENTS

| | | |
|---|---|---|
| EP | 0 247 489 A2 | 12/1987 |
| EP | 247489 A2 * | 12/1987 |
| EP | 0 327 906 A1 | 8/1989 |
| EP | 0 333 083 A2 | 9/1989 |
| EP | 1743910 A1 * | 1/2007 |
| JP | 63-90588 A | 4/1988 |
| JP | 63-99285 A | 4/1988 |
| JP | 1-315471 A | 12/1989 |
| JP | 3-103409 A | 4/1991 |
| JP | 05-017538 * | 1/1993 |
| JP | 9-12641 A | 1/1997 |
| JP | 11-124419 * | 5/1999 |
| JP | 2002-105433 * | 4/2002 |
| JP | 2003-154307 * | 5/2003 |
| WO | WO-2005/097850 A1 * | 10/2005 |

OTHER PUBLICATIONS

Takashige Maekawa, "Fluorine-Containing Surface Modifying Agents", Fine Chemical, vol. 23, No. 6, 1994, pp. 12-25.

U.S. Environmental Protection Agency, "Preliminary Risk Assessment of the Development Toxicity Associated With Exposure to Perfluorooctanoic Acid and Its Salts", U.S. Environmental Protection Agency Office of Pollution Prevention and Toxics Risk Assessment Division, Apr. 10, 2003, pp. 1-61.

U.S. Environmental Protection Agency, "Perfluorooctanoic Acid (PFOA), Fluorinated Telomers; Request for Comment, Solicitation of Interested Parties for Enforceable Consent Agreement Development, and Notice of Public Meeting", Federal Register, vol. 68, No. 73, Wednesday, Apr. 16, 2003/Notices, pp. 18626-18633.

U.S. Environmental Protection Agency, "EPA Intensifies Scientific Investigation of a Chemical Processing Aid", EPA Environmental News, Monday Apr. 2003, pp. 1-2.

U.S. Environmental Protection Agency, "EPA Oppt Fact Sheet" Apr. 14, 2003.

\* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

A surface-treating agent comprises a fluoropolymer comprising (A) repeating units derived from a fluorine-containing monomer of the formula:

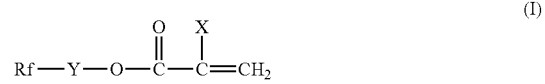

(B) repeating units derived from a monomer free from a fluorine atom, and (C) optionally, repeating units derived from a crosslinkable monomer. The surface treating agent is excellent in water repellency, oil repellency and unsusceptibility to fouling even when the side chains are $C_4$ or lower fluoroalkyl groups.

11 Claims, No Drawings

SURFACE-TREATING AGENT COMPRISING FLUOROPOLYMER

TECHNICAL FIELD

The present invention relates to a polymer and a treatment which impart excellent water repellency, oil repellency and soil resistance to a textile, a masonry, an electrostatic filter, a dust protective mask, and a part of fuel cell.

BACKGROUND ART

Hitherto, a fluorine-containing acrylate polymer is used as an active component of a water- and oil-repellent agent. Side chain fluoroalkyl groups in practically used fluorine-containing acrylate monomers usually have at least 8 carbon atoms. There is a defect that the fluorine-containing acrylate monomer is excessively hydrophobic since the length of the fluoroalkyl chain is long. The excessive hydrophobicity has caused various problems on the preparation and properties of the fluorine-containing acrylate polymer.

When an emulsion polymerization is used for the preparation of the fluorine-containing acrylate polymer, there are problems that emulsifiers should be used in a large amount and the types of the emulsifiers are limited, and that an auxiliary solvent should be used because of poor solubility with another fluorine-free monomer. When a solution polymerization is used for the preparation of the fluorine-containing acrylate polymer, there was the problem that the fluorine-containing acrylate monomer has low solubility in a polymerization solvent so that a sufficient monomer solution cannot be obtained.

As to the properties of the fluorine-containing acrylate polymer, there is the problem that sufficient water repellency cannot be imparted to the substrate. This problem seems to be caused by excessive hydrophobicity given by the long fluoroalkyl group.

Various up-to-date research results indicate that in view of the practical treatment of fibers with the surface treatment agent (particularly the water- and oil-repellent agent), the important surface property is not a static contact angle, but is a dynamic contact angle, particularly a reversing contact angle. That is, the advancing contact angle of water is not dependent on the carbon number of the fluoroalkyl side chain, but the reversing contact angle of water in the case of carbon number of at most 7 is remarkably low than that in the case of carbon number of at least 8. In correspondence to this, an X ray analysis shows that the side chain crystallizes when the carbon number of side chain is at least 7. It is known that the practical water repellency has the relationship with the crystallization of the side chain and that motility of the surface treatment agent molecules is an important factor for revelation of the practical performances (for example, MAEKAWA Takashige, FINE CHEMICAL, Vol. 23, No. 6, page 12 (1994)). Accordingly, it is believed that the acrylate polymer having low carbon number of fluoroalkyl group in the side chain which is at most 7 (particularly at most 6) has low crystallinity so that the polymer cannot satisfy the practical performances (particularly water repellency).

JP-A-63-90588, JP-A-63-99285 and JP-A-01-315471 disclose that a fluorine-containing acrylate polymer wherein the alpha-position is substituted with fluorine, chlorine or the like has good properties such as good adhesion to a substrate, high strength of a film and good water- and oil-repellency. These publications describe that the fluoroalkyl group used in Examples has at least 8 carbon atoms and does not suggest to use the acrylate monomer having the fluoroalkyl group having at most 6 carbon atoms.

Recent study results (EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)) and the like clarify that a PFOA (perfluorooctanoic acid) doubtfully has a potential risk of environmental load. EPA (Environmental Protection Agency of USA) announced on Apr. 14, 2003 that the EPA intensifies the scientific investigation on PFOA.

On the other hand, Federal Register (FR Vol. 68, No. 73/Apr. 16, 2003 [FRL-2303-8]) (http://www.epa.gov/opptintr/pfoa/pfoafr.pdf), EPA Environmental News for release Monday April, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a "telomer" may possibly metabolize or decompose to PFOA. It is also announced that the "telomer" is used in a large number of commercial products including fire fighting foams, care products and cleaning products as well as soil, stain and grease resistant coating on carpets, textiles, paper, and leather.

DISCLOSURE OF THE INVENTION

Technical Problems to be Solved by the Invention

An object of the present invention is to provide a fluorine-containing acrylate polymer having excellent water repellency, oil repellency, soil resistance and stain adhesion resistance, even when a side chain is a short fluoroalkyl group having at most 6 carbon atoms.

Another object of the present invention is to provide a substitute compound having chemical skeleton structure which is different from the above-mentioned "telomer".

Measures for Solving Problems

The present invention provides a surface treatment agent comprising a fluorine-containing polymer comprising:
(A) repeating units derived from a fluorine-containing monomer of the formula:

(I)

wherein X is a fluorine atom, a chlorine atom, a bromine atom, a iodine atom, a $CFX^1X^2$ group (wherein $X^1$ and $X^2$ is a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group, Y is an aliphatic group having 1 to 10 carbon atoms, an aromatic or cycloaliphatic group having 6 to 10 carbon atoms, a $-CH_2CH_2N(R^1)SO_2-$ group (wherein $R^1$ is an alkyl group having 1 to 4 carbon atoms) or $-CH_2CH(OY^1)CH_2-$ group (wherein $Y^1$ is a hydrogen atom or an acetyl group), Rf is a linear or branched fluoroalkyl group having 1 to 6 carbon atoms,
(B) repeating units derived from a monomer free from a fluorine atom, and
(C) optionally, repeating units derived from a crosslinkable monomer.

PREFERRED EMBODIMENTS FOR CARRYING OUT THE INVENTION

The fluorine-containing polymer constituting the surface treatment agent of the present invention is a copolymer comprising
(a) the fluorine-containing monomer of the formula (I) wherein an alpha-position is substituted by a X group,
(b) the monomer free from a fluorine atom, and
optionally present, (c) the crosslinkable monomer.

The repeating units (A) are derived from (a) the fluorine-containing monomer of the formula (I). In the formula (I), the Rf group is preferably a perfluoroalkyl group. The carbon number of the Rf group is from 1 to 6, for example, from 1 to 4.

Y is preferably an aliphatic group having 1 to 10 carbon atoms, an aromatic group or cycloaliphatic group having 6 to 10 carbon atoms, a —$CH_2CH_2N(R^1)SO_2$— group ($R^1$ is an alkyl group having 1 to 4 carbon atoms) or a —$CH_2CH(OY^1)CH_2$— group ($Y^1$ is a hydrogen atom or an acetyl group). The aliphatic group is preferably an alkylene group (particularly the carbon number is from 1 to 4, for example, 1 or 2). The aromatic group and cycloaliphatic group may be substituted or unsubstituted.

Examples of fluorine-containing monomer (a) are as follows:

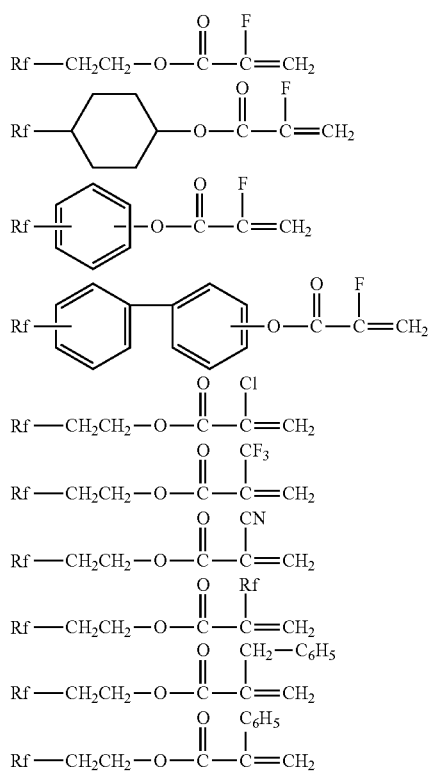

wherein Rf is a linear or branched fluoroalkyl group having 1 to 6 carbon atoms.

The repeating units (B) are derived from (b) the monomer free from a fluorine atom. The monomer (b) is preferably a fluorine-free monomer having a carbon-carbon double bond. The monomer (b) is preferably a vinyl monomer which is free from fluorine. The fluorine atom-free monomer (b) is generally a compound having one carbon-carbon double bond. Preferable examples of the fluorine atom-free monomer (b) include, for example, ethylene, vinyl acetate, vinylidene halide, acrylonitrile, styrene, polyethyleneglycol (meth)acrylate, polypropyleneglycol (meth)acrylate, methoxypolyethyleneglycol (meth)acrylate, methoxypolypropyleneglycol (meth)acrylate, vinyl alkyl ether and isoprene. The fluorine atom-free monomer (b) is not limited to these examples.

The fluorine atom-free monomer (b) may be a (meth)acrylate ester having an alkyl group. The number of carbon atoms of the alkyl group may be from 1 to 30, for example, from 6 to 30, e.g., from 10 to 30. For example, the fluorine atom-free monomer (b) may be acrylates of the general formula:

$$CH_2=CA^1COOA^2$$

wherein $A^1$ is a hydrogen atom or a methyl group, and $A^2$ is an alkyl group represented by $C_nH_{2n+1}$ (n=1 to 30).

The repeating units (C) are derived from the crosslinkable monomer (c). The crosslinkable monomer (c) may be a fluorine-free monomer having at least two reactive groups and/or carbon-carbon double bonds. The crosslinkable monomer (c) may be a compound having at least two carbon-carbon double bonds, or a compound having at least one carbon-carbon double bond and at least one reactive group. Examples of the reactive group include a hydroxyl group, an epoxy group, a chloromethyl group, a blocked isocyanate group, an amino group and a carboxyl group.

Examples of the crosslinkable monomer (c) include diacetoneacrylamide, (meth)acrylamide, N-methylolacrylamide, hydroxymethyl(meth)acrylate, hydroxyethyl(meth)acrylate, 3-chloro-2-hydroxypropyl(meth)acrylate, N,N-dimethylaminoethyl (meth)acrylate, N,N-diethylaminoethyl (meth)acrylate, butadiene, chloroprene and glycidyl (meth)acrylate, to which the crosslinkable monomer is not limited.

The copolymerization with the monomer (b) and/or the monomer (c) can optionally improve various properties such as water- and oil-repellency and soil resistance; cleaning durability and washing durability of said repellency and resistance; solubility in solvent; hardness; and feeling.

In the fluorine-containing polymer,
the amount of the fluorine atom-free monomer (b) may be from 0.1 to 100 parts by weight, for example, from 0.1 to 50 parts by weight, and
the amount of the crosslinkable monomer (c) may be at most 50 parts by weight, for example, at most 20 parts by weight, particularly, from 0.1 to 15 parts by weight,
based on 100 parts by weight of the fluorine-containing monomer (a).

The fluorine-containing polymer can be produced as follows.

In a solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer(s) and dissolves the monomer(s), and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 50 to 2,000 parts by weight, for example, from 50 to 1,000 parts by weight, based on 100 parts by weight of total of the monomers.

In an emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutyl-amidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is desirable that the monomers are atomized in water by using an emulsifying device capable of applying a strong shattering energy (e.g., a high-pressure homogenizer and an ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

The surface treatment agent of the present invention is preferably in the form of a solution, an emulsion or an aerosol. The surface treatment agent generally comprises the fluorine-containing polymer and a medium (particularly a liquid medium, for example, an organic solvent and/or water). The concentration of the fluorine-containing polymer in the surface treatment agent, which is in the form of a solution or an emulsion, may be, for example, from 0.01 to 50% by weight.

The surface treatment agent can be applied to a substrate to be treated by a know procedure. Usually, the surface treatment agent is diluted or dispersed with an organic solvent or water, is adhered to surfaces of the substrate by a well-known procedure such as an immersion coating, a spray coating and a foam coating, and is dried. If necessary, the surface treatment agent is applied together with a suitable crosslinking agent, followed by curing. It is also possible to add other surface treatment agents (for example, a water repellent agent and an oil repellent agent), or mothproofing agents, softeners, antimicrobial agents, flame retardants, antistatic agents, paint fixing agents, crease-proofing agents, etc. to the surface treatment agent of the present invention. For the immersion coating, the concentration of the fluorine-containing compound in the treatment liquid contacted with the substrate may be from 0.05 to 10% by weight, based on the treatment liquid. For the spray coating, the concentration of the fluorine-containing compound in the treatment liquid may be from 0.1 to 5% by weight, based on the treatment liquid. A stain blocker may be used. When the stain blocker is used, it is preferable to use an anionic emulsifier or a nonionic surfactant.

The substrate to be treated with the surface treatment agent (for example, a water- and oil-repellent agent) of the present invention include a textile, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster. The textile may be particularly a carpet. The textile has various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers. The treatment agent of the present invention is excellent in resistance in a detergent liquid and brushing (mechanical), it can be suitably used for carpet made from nylon or polypropylene.

The textile may be in any form such as a fiber, a fabric and the like. When the carpet is treated with the surface treatment agent of the present invention, the carpet may be formed after treating fibers or yarns with the surface treatment agent, or the formed carpet may be treated with the surface treatment agent.

EXAMPLES

The following Examples further illustrate the present invention in detail but are not to be construed to limit the scope thereof.

Shower Water Repellency Test

The shower water repellency was expressed by water repellency No. (as shown in the below-described Table 1) conducted according to JIS-L-1092.

TABLE 1

| Water repellency No. | State |
|---|---|
| 5 | No wet or adhesion on surface |
| 4 | Slight wet or adhesion on surface |
| 3 | Partial wet on surface |
| 2 | Wet on whole surface |
| 1 | Wet on front and back whole surfaces |

Water-Repellency Test

A treated fabric is stored in a thermo-hygrostat having a temperature of 21° C. and a humidity of 65% for at least 4 hours. A test liquid (isopropyl alcohol (IPA), water, and a mixture thereof, as shown in Table 2) which has been also stored at 21° C. is used. The test is conducted in an air-conditioned room having a temperature of 21° C. and a humidity of 65%. A droplet of the test liquid in an amount of 0.05 mL is softly dropped by a micropipette on the fabric. If the droplet remains on the fabric after standing for 30 seconds, the test liquid passes the test. The water-repellency is expressed by a point corresponding to a maximum content (% by volume) of isopropyl alcohol (IPA) in the test liquid which passes the test. The water-repellency is evaluated as twelve levels which are Fail, 0, 1, 2, 3, 4, 5, 6, 7, 8, 9 and 10 in order of a poor level to an excellent level.

TABLE 2

| | Water-repellency test liquid | |
|---|---|---|
| | (% by volume) | |
| Point | Isopropyl alcohol | Water |
| 10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl alcohol 0/water 100 | |

Oil-Repellency Test

A treated fabric is stored in a thermo-hygrostat having a temperature of 21° C. and a humidity of 65% for at least 4 hours. A test liquid (shown in Table 3) which has been also stored at 21° C. is used. The test is conducted in an air-conditioned room having a temperature of 21° C. and a humidity of 65%. A droplet of the test liquid in an amount of 0.05 mL is softly dropped by a micropipette on the fabric. If the droplet remains on the fabric after standing for 30 seconds, the test liquid passes the test. The oil-repellency is expressed by a maximum point of the test liquid which passes the test. The oil-repellency is evaluated as nine levels which are Fail, 1, 2, 3, 4, 5, 6, 7 and 8 in order of a poor level to an excellent level.

TABLE 3

| | Oil-repellency test liquid | |
|---|---|---|
| Point | Test liquid | Surface tension (dyne/cm, 25° C.) |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture liquid of n-Hexadecane 35/nujol 65 | 29.6 |
| 1 | Nujol | 31.2 |
| Fail | Inferior to 1 | — |

Storage Stability Test

Test liquids (3 mass % in ethyl acetate) are prepared from polymers obtained in Preparative Examples and Comparative Preparative Examples. After the test liquid is left standing for 24 hours at room temperature (25° C.), the evaluation of sedimentation of the treatment liquid is observed.
Good: No sedimentation
Fair: Slight sedimentation
Poor: Much sedimentation Monomers were prepared as follows:

Preparative Example 1

Synthesis of 9F-Alc/αF Monomer

Into a 200 mL four-necked flask, 2-fluoroacrylic acid (19 g, 0.21 mol) and triethylamine (22.94 g, 0.23 mol) were charged. The atmosphere was purged with nitrogen for 30 minutes with stirring. After the internal temperature of the flask was decreased to 5° C. with ice, 2-(perfluorobutyl)ethanol (9F-Alc) (54.52 g, 0.21 mol) was dropwise added for 4.5 hours so that a maximum of the internal temperature under nitrogen was 15° C. After the completion of the dropwise addition, the cooling with ice was continued for 30 minutes so that the exothermic reaction subsided and the internal temperature became 5° C. After the internal temperature was increased to the room temperature, no increase of the internal temperature was confirmed and the reaction was ripened for one hour. The reaction liquid was filtered and kept standing for one night. The reaction liquid was neutralized with an aqueous 10% $NaHCO_3$ solution and washed three times to give a dark brown liquid (54.00 g) (Yield 77.82%). The product was identified by $^1$H-NMR, $^{19}$F-NMR and $^{13}$C-NMR.

Preparative Example 2

Synthesis of 9F-Alc/αCl Monomer

Into a 200 mL four-necked flask, 2-chloroacrylic acid (20 g, 0.19 mol), 2-(perfluorobutyl)ethanol (9F-Alc) (59.49 g, 0.23 mol), p-toluene sulfonic acid (1.06 g, 0.0056 mol), t-butyl catechol (0.16 g, 0.001 mol) and cyclohexane (90 g, 1.07 mol) were charged. The flask was heated so that the internal temperature of the reactor was 80° C. The dehydration condensation reaction was conducted by using a Dean-Stark method. The reaction was conducted for 16 hours. After the completion of the reaction, a small amount of brown sedimentations in the reaction liquid were filtered off, the water washing was conducted three times. Then, the solvent and excess 9F-Alc were removed by an evaporator to give a dark brown liquid (46.86 g) (Yield: 70.79%). The product was identified by $^1$H-NMR, $^{19}$F-NMR and $^{13}$C-NMR.

Polymers were prepared as follows:

Preparative Example 3

Synthesis of 9F-Alc/αF Homopolymer

Into a 200 mL four-necked flask, the monomer synthesized in Preparative Example 1 (9F-Alc/αF monomer) (15 g, 0.047 mol) and tetrachlorohexafluorobutane (S-316 manufactured by Daikin Industries, Ltd.) (121.45 g) were charged. After the solution was bubbled with nitrogen for 30 minutes, a gaseous phase was replaced with nitrogen for 30 minutes. After the internal temperature was increased to 60° C., a solution of PERBUTYL PV 1.61 g (0.0092 mol) in trichloroethane (7.86 g) was added and the reaction was conducted for 6 hours. The reaction was monitored by a gas chromatography, and the disappearance of monomer peaks was confirmed and regarded as the completion of the reaction. After the completion of the reaction, methanol was added to a solution containing a polymer to precipitate a yellow precipitation. The precipitation was filtered under a reduced pressure and dried in a vacuum desiccator to give a cream-colored flake solid (10.59 g) (Polymer yield: 70.60%). The polymer was identified by an elemental analysis (Table 4), $^1$H-NMR, $^{19}$F-NMR and $^{13}$C-NMR.

Preparative Example 4

9F-Alc/αCl Homopolymer

Into a 100 mL four-necked flask, the monomer synthesized in Preparative Example 2 (9F-Alc/αCl monomer) (10 g, 0.028 mol) and tetrachlorohexafluorobutane (S-316 manufactured by Daikin Industries, Ltd.) (80.95 g) were charged. After the solution was bubbled with nitrogen for 30 minutes, a gaseous phase was replaced with nitrogen for 30 minutes. After the internal temperature was increased to 60° C., a solution of PERBUTYL PV 1.08 g (0.062 mol) in trichloroethane (5.24 g) was added and the reaction was conducted for 6 hours. The reaction was monitored by a gas chromatography, and the disappearance of monomer peaks was confirmed and regarded as the completion of the reaction. After the completion of the reaction, methanol was added to a solution containing a polymer to precipitate a white precipitation. The precipitation was filtered under a reduced pressure and dried in a vacuum desiccator to give a white powder compound (8.17 g) (Polymer yield: 81.77%). The polymer was identified by an elemental analysis (Table 4), $^1$H-NMR, $^{19}$F-NMR and $^{13}$C-NMR.

Preparative Example 5

9F-Alc/αF StA Copolymer

Into a 100 mL four-necked flask, the monomer synthesized in Preparative Example 1 (9F-Alc/αF monomer) (7.00 g, 0.021 mol), stearyl acrylate (3.00 g, 0.0093 mol) and tetrachlorohexafluorobutane (S-316 manufactured by Daikin Industries, Ltd.) (56.47 g) were charged. After the solution was bubbled with nitrogen for 30 minutes, a gaseous phase was replaced with nitrogen for 30 minutes. After the internal temperature was increased to 60° C., a solution of PERBUTYL PV (0.75 g, 0.043 mol) in trichloroethane (3.67 g) was added and the reaction was conducted for 6 hours. The reaction was monitored by a gas chromatography, and the disappearance of peaks of the 9F-Alc/αF monomer and the stearyl acrylate monomer was confirmed and regarded as the completion of the reaction. After the completion of the reaction, methanol was added to a solution containing a polymer to precipitate a cream-colored precipitation. The precipitation was filtered under a reduced pressure and dried in a vacuum desiccator to give a cream-colored rubbery compound (7.12 g) (Polymer yield: 71.2%). The polymer was identified by an elemental analysis (Table 4), $^1$H-NMR, $^{19}$F-NMR and $^{13}$C-NMR. The composition of monomers in the polymer was almost the same as the charged monomers.

Preparative Example 6

9F-Alc/αCl StA Copolymer

Into a 100 mL four-necked flask, the monomer synthesized in Preparative Example 2 (9F-Alc/αCl monomer) (7.00 g, 0.020 mol), stearyl acrylate (3.00 g, 0.0093 mL) and tetrachlorohexafluorobutane (S-316 manufactured by Daikin Industries, Ltd.) (56.47 g, 0.19 mol) were charged. After the solution was bubbled with nitrogen for 30 minutes, a gaseous phase was replaced with nitrogen for 30 minutes. After the internal temperature was increased to 60° C., a solution of PERBUTYL PV (0.75 g, 0.043 mol) in trichloroethane (3.67 g) was added and the reaction was conducted for 6 hours. Then, a solution of PERBUTYL PV (0.75 g, 0.043 mol) in trichloroethane (3.67 g) was further added and the reaction was conducted for 6 hours.

The reaction was monitored by a gas chromatography, and the disappearance of peaks of the 9F-Alc/αCl monomer and the stearyl acrylate monomer was confirmed and regarded as the completion of the reaction. After the completion of the reaction, methanol was added to a solution containing a polymer to precipitate a white precipitation. The precipitation was filtered under a reduced pressure and dried in a vacuum desiccator to give a white powder compound (7.86 g) (Polymer yield: 78.6%). The polymer was identified by an elemental analysis (Table 4), $^1$H-NMR, $^{19}$F-NMR and $^{13}$C-NMR. The composition of monomers in the polymer was almost the same as the charged monomers.

Comparative Preparative Example 1

9F-Alc/AA Homopolymer

Into a 200 mL four-necked flask, 2-(perfluorobutyl)ethyl acrylate (9F-Alc/AA) (R-1420 manufactured by Daikin Chemicals Sales Corporation) (15 g, 0.047 mol) and tetrachlorohexafluorobutane (S-316 manufactured by Daikin Industries, Ltd.) (121.45 g) were charged. After the solution was bubbled with nitrogen for 30 minutes, a gaseous phase was replaced with nitrogen for 30 minutes. After the internal temperature of the flask was increased to 60° C., a solution of PERBUTYL PV (1.61 g, 0.0092 mol) in trichloroethane (7.86 g) was added and the reaction was conducted for 5 hours. The reaction was monitored by a gas chromatography, and the disappearance of monomer peaks was confirmed and regarded as the completion of the reaction. After the completion of the reaction, methanol was added to a solution containing a polymer to precipitate a white starch syrup-like precipitation. A supernatant liquid was removed off by decantation and a solvent was removed off from the precipitation by an evaporator to give a highly viscous transparent liquid compound (9.36 g) (Polymer yield: 62.40%). The polymer was identified by an elemental analysis (Table 4), $^1$H-NMR, $^{19}$F-NMR and $^{13}$C-NMR.

Comparative Preparative Example 2

17F-Alc/AA Homopolymer

Into a 200 mL four-necked flask, 2-(perfluorooctyl)ethyl acrylate (17F-Alc/AA) (R-1820 manufactured by Daikin Chemicals Sales Corporation) (15 g, 0.03 mol) and tetrachlorohexafluorobutane (S-316 manufactured by Daikin Industries, Ltd.) (121.45 g, 0.40 mol) were charged. After the solution was bubbled with nitrogen for 30 minutes, a gaseous phase was replaced with nitrogen for 30 minutes. After the internal temperature of the flask was increased to 60° C., a solution of PERBUTYL PV (1.61 g, 0.0092 mol) in trichloroethane (7.86 g) was added and the reaction was conducted for 5 hours. The reaction was monitored by a gas chromatography, and the disappearance of monomer peaks was confirmed and regarded as the completion of the reaction. After the completion of the reaction, methanol was added to a solution containing a polymer to precipitate a white precipitation. The precipitation was filtered under a reduced pressure and dried in a vacuum desiccator to give a white powdery compound (12.55 g) (Polymer yield: 83.33%). The polymer was identified by an elemental analysis (Table 4), $^1$H-NMR, $^{19}$F-NMR and $^{13}$C-NMR.

Comparative Preparative Example 3

9F-Alc/AA StA Copolymer

Into a 100 mL four-necked flask, 2-(perfluorobutyl)ethyl acrylate (9F-Alc/AA) (R-1420 manufactured by Daikin Chemicals Sales Corporation) (7.00 g, 0.022 mol), stearyl acrylate (3.00 g, 0.0093 mol) and tetrachlorohexafluorobutane (S-316 manufactured by Daikin Industries, Ltd.) (56.47 g, 0.19 mol) were charged. After the solution was bubbled with nitrogen for 30 minutes, a gaseous phase was replaced with nitrogen for 30 minutes. After the internal temperature of the flask was increased to 60° C., a solution of PERBUTYL PV (0.75 g, 0.0043 mol) in trichloroethane (3.67 g) was added, the reaction was conducted for 6 hours. Then a solution of PERBUTYL PV (0.75 g, 0.0043 mol) in trichloroethane (3.67 g) was further added and the reaction was conducted for 6 hours. The reaction was monitored by a gas chromatography, and the disappearance of peaks of the 9F-Alc/AA monomer and the stearyl acrylate monomer was confirmed and regarded as the completion of the reaction. After the completion of the reaction, methanol was added to a solution containing a polymer to precipitate a white precipitation. A supernatant liquid was removed off by decantation and a solvent was removed off from the precipitation by an evaporator to give a highly viscous opaque liquid compound (7.06 g) (Polymer yield: 70.60%). The polymer was identified by an elemental analysis (Table 4), $^1$H-NMR, 19F-NMR and $^{13}$C-NMR. The composition of monomers in the polymer was almost the same as the charged monomers.

Comparative Preparative Example 4

17F-Alc/AA StA Copolymer

Into a 200 mL four-necked flask, 2-(perfluorooctyl)ethyl acrylate (17F-Alc/AA) (R-1820 manufactured by Daikin Chemicals Sales Corporation) (21.00 g, 0.041 mol), stearyl acrylate (9.00 g, 0.028 mol) and tetrachlorohexafluorobutane (S-316 manufactured by Daikin Industries, Ltd.) (170.00 g, 0.56 mol) were charged. After the solution was bubbled with nitrogen for 30 minutes, a gaseous phase was replaced with nitrogen for 30 minutes. After the internal temperature of the flask was increased to 60° C., a solution of PERBUTYL PV (2.25 g, 0.013 mol) in trichloroethane (11.00 g) was added, the reaction was conducted for 5 hours. Then a solution of PERBUTYL PV (0.75 g, 0.0043 mol) in trichloroethane (3.67 g, 0.027 mol) was further added and the reaction was conducted for 5 hours. The reaction was monitored by a gas chromatography, and the disappearance of peaks of the 17F-Alc/AA monomer and the stearyl acrylate monomer was confirmed and regarded as the completion of the reaction. After the completion of the reaction, methanol was added to a solution containing a polymer to precipitate a white precipitation. The white precipitation was filtered under a reduced pressure and dried in a vacuum desiccator to give a white powdery compound (27.07 g) (Polymer yield: 90.23%). The polymer was identified by an elemental analysis (Table 4), $^1$H-NMR, $^{19}$F-NMR and $^{13}$C-NMR. The composition of monomers in the polymer was almost the same as the charged monomers.

Comparative Preparative Example 5

Synthesis of 17F-Alc/αCl Monomer

In a 500 ml shaded four-necked flask, 2-(perfluorooctyl) ethyl acrylate (17F-Alc/AA) (R-1820 manufactured by Daikin Chemicals Sales Corporation) (251 g, 484 mmol), triethylamine (1.47 g, 14.5 mmol), t-butylcatechol (0.1 g) were charged. Chlorine was blown into the flask at a temperature between room temperature and 50° C. for 17 hours to give a dichloro compound (285 g).

According to a gas chromatography analysis, the conversion was 100% and the selectivity of the dichloro compound was 97% (G.C. Area). The structure of the object compound was confirmed by $^1$H-NMR.

Then chloroform (640 g) and t-butylcatechol (0.1 g) were charged into a 2 L Erlenmeyer flask and triethylamine was (58.7 g, 581 mmol) was added while cooling with ice. When the exothermic heat was relieved, the dichloro compound (285 g, 484 mmol, G.C. purity: 97%) was gradually added while cooling with ice. After the whole amount of the dichloro compound was added, the dichloro compound was reacted at room temperature for about 30 minutes. The disappearance of the dichloro compound was confirmed by a gas chromatography.

The mixture was washed with water to eliminate a triethylamine hydrochloride salt and evaporated to eliminate chloroform, giving a brown solid (224 g, yield: 84%). The product was identified by $^1$H-NMR, $^{19}$F-NMR and $^{13}$C-NMR.

Comparative Preparative Example 6

17F-Alc/αCl Homopolymer

Into a 100 mL four-necked flask, the 17F-Alc/αCl monomer (15 g, 0.027 mol) synthesized in Comparative Preparative Example 5 and tetrachlorohexafluorobutane (S-316 manufactured by Daikin Industries, Ltd.) (121.4 g) were charged. After the solution was bubbled with nitrogen for 30 minutes, a gaseous phase was replaced with nitrogen for 30 minutes. After the internal temperature of the flask was increased to 60° C., a solution of PERBUTYL PV (1.61 g, 0.0067 mol) in trichloroethane (5 g) was added and the reaction was conducted for 4 hours. Then a solution of PERBUTYL PV (0.32 g, 0.0013 mol) in trichloroethane (2 g) was further added and the reaction was conducted for 1 hour. The reaction was monitored by a gas chromatography, and the disappearance of monomer peaks was confirmed and regarded as the completion of the reaction. After the completion of the reaction, methanol was added to a solution containing a polymer to precipitate a white precipitation. The precipitation was filtered under a reduced pressure and dried in a vacuum desiccator to give a white powdery compound (12.4 g) (Polymer yield: 83%). The polymer was identified by $^1$H-NMR, $^{19}$F-NMR and $^{13}$C-NMR.

Comparative Preparative Example 7

17F-Alc/αCl StA Copolymer

Into a 100 mL four-necked flask, the 17F-Alc/αCl monomer (14 g, 0.025 mol) synthesized in Comparative Preparative Example 5, stearyl acrylate (6.00 g, 0.019 mol) and tetrachlorohexafluorobutane (S-316 manufactured by Daikin Industries, Ltd.) (113.3 g, 0.373 mol) were charged. After the solution was bubbled with nitrogen for 30 minutes, a gaseous phase was replaced with nitrogen for 30 minutes. After the internal temperature of the flask was increased to 60° C., a solution of PERBUTYL PV (1.5 g, 0.0062 mol) in trichloroethane (5 g) was added and the reaction was conducted for 4 hours. Then a solution of PERBUTYL PV (0.3 g, 0.0012 mol) in trichloroethane (3 g) was further added and the reaction was conducted for 6 hours. After the completion of the reaction, methanol was added to a solution containing a polymer to precipitate a white precipitation. The precipitation was filtered under a reduced pressure and dried in a vacuum desiccator to give a white powdery compound (17.2 g) (Polymer yield: 86%). The polymer was identified by $^1$H-NMR, $^{19}$F-NMR and $^{13}$C-NMR. The composition of monomers in the polymer was almost the same as the charged monomers.

Example 1

The polymer (6 g) obtained in Preparative Example 3 was dissolved in HCFC225 (600 g). After three nylon test fabrics (510 mm×205 mm) were immersed in this test solution (150 g) for about 5 minutes, and the solvent was removed by centrifugal dehydrator (500 rpm, 20 seconds) The same procedure was conducted for three PET test fabrics (510 mm×205 mm), three PET/cotton mixture test fabrics (510 mm×205 mm) and three cotton test fabrics (510 mm×205 mm). Then each test fabric was dried at 28° C. for one night.

Then, each one fabric from nylon test fabrics, PET test fabrics, PET/cotton mixture test fabrics and cotton test fabrics was treated by a pin tenter at 80° C. for 3 minutes, and each fabric was cut into halves (255 mm×205 mm). One half was used for a shower water repellency test, and the other half was used for a water repellency test and an oil repellency test.

Then, each one fabric from nylon test fabrics, PET test fabrics, PET/cotton mixture test fabrics and cotton test fabrics was treated by a pin tenter at 150° C. for 3 minutes, and each fabric was cut into halves (255 mm×205 mm). One half was used for a shower water repellency test, and the other half was used for a water repellency test and an oil repellency test.

Remaining nylon test fabric, PET test fabric, PET/cotton mixture test fabric and cotton test fabric were not subjected to the heat treatment, and were cut into halves (255 mm×205 mm). One half was used for a shower water repellency test, and the other half was used for a water repellency test and an oil repellency test. The test results are shown in Table 5.

Storage stability of a 3 weight % concentration solution of the polymer in ethyl acetate stored at 25° C. for 24 hours was also measured. The results are shown in Table 6.

Example 2

The polymer obtained in Preparative Example 4 was treated as in Example 1, and then subjected to the shower water repellency test, the water repellency test and the oil repellency test. The test results are shown in Table 5.

The storage stability was also measured. The results are shown in Table 6.

Example 3

The polymer obtained in Preparative Example 5 was treated as in Example 1, and then subjected to the shower water repellency test, the water repellency test and the oil repellency test. The test results are shown in Table 5.

The storage stability was also measured. The results are shown in Table 6.

Example 4

The polymer obtained in Preparative Example 6 was treated as in Example 1, and then subjected to the shower water repellency test, the water repellency test and the oil repellency test. The test results are shown in Table 5.

The storage stability was also measured. The results are shown in Table 6.

Example 5

The 9F-Alc/αF monomer synthesized in Preparative Example 1 was dissolved in each of isopropyl alcohol, toluene, n-heptane, mineral spirit, methyl methacrylate, ethyl methacrylate and glycidyl methacrylate to give a solution having a concentration of 3 mass % and the solution was left to stand at room temperature (25° C.) for 24 hours. The evolution of sedimentation was observed. The criteria of the evaluation were the same as the storage stability test. The results are shown in Table 7.

The 9F-Alc/αCl monomer synthesized in Preparative Example 2,2-(perfluorobutyl)ethyl acrylate (9F-Alc/AA) (R-1420 manufactured by Daikin Chemicals Sales Corporation) used in Comparative Preparative Example 1, perfluoroacrylate monomer [$CF_3CF_2(CF_2CF_2)_nCH_2CH_2OC(=O)CH=CH_2$ (a mixture of compounds wherein n=3, 4, 5, 6 and 7 in amounts of 50 mass %, 25 mass %, 12 mass %, 6 mass % and 3 mass %)] (17F-Alc/AA) also were subjected to the solubility test in the same manner. The results are shown in Table 7.

Comparative Example 1

The polymer obtained in Comparative Preparative Example 1 was treated as in Example 1, and then subjected to the shower water repellency test, the water repellency test and the oil repellency test. The test results are shown in Table 5.

The storage stability of the test solution also was measured. The results are shown in Table 6.

Comparative Example 2

The polymer obtained in Comparative Preparative Example 2 was subjected to the storage stability test of the test solution. The results are shown in Table 6.

Comparative Example 3

The polymer obtained in Comparative Preparative Example 3 was treated as in Example 1, and then subjected to the shower water repellency test, the water repellency test and the oil repellency test. The test results are shown in Table 5.

The storage stability of the test solution also was measured. The results are shown in Table 6.

Comparative Example 4

The polymer obtained in Comparative Preparative Example 4 was subjected to the storage stability test of the test solution. The results are shown in Table 6.

Comparative Example 5

The polymer obtained in Comparative Preparative Example 6 (6 g) was dissolved in HCFC 225 (600 g). After three nylon test fabrics (510 mm×205 mm) were immersed in this test solution (150 g) for about 5 minutes, and the solvent was removed by centrifugal dehydrator (500 rpm, 20 seconds). Then each test fabric was dried at 28° C. for one night.

Then, each of test fabrics was treated by a pin tenter at 150° C. for 3 minutes, each fabric was cut into halves (255 mm×205 mm). One half was used for a shower water repellency test, and the other half was used for a water repellency test and an oil repellency test.

The test results are shown in Table 8.

Comparative Example 6

The polymer obtained in Comparative Preparative Example 7 was treated as in Comparative Example 5, and then subjected to the shower water repellency test, the water repellency test and the oil repellency test. The test results are shown in Table 8.

TABLE 4

| Elemental Analysis | | Preparative Example 3 | Preparative Example 4 | Preparative Example 5 | Preparative Example 6 | Comparative Preparative Example 1 | Comparative Preparative Example 2 | Comparative Preparative Example 3 | Comparative Preparative Example 4 |
|---|---|---|---|---|---|---|---|---|---|
| F | Found (%) | 55.01 | 47.32 | 37.72 | 31.95 | 49.74 | 57.80 | 35.97 | 42.12 |
|   | Calculated (%) | 56.55 | 48.51 | 39.58 | 33.96 | 53.77 | 62.37 | 37.64 | 43.65 |
| C | Found (%) | 31.33 | 31.17 | 45.42 | 46.39 | 33.67 | 30.28 | 42.85 | 44.05 |
|   | Calculated (%) | 32.14 | 30.64 | 45.83 | 44.78 | 33.96 | 30.12 | 47.11 | 44.41 |
| H | Found (%) | 1.89 | 2.09 | 4.96 | 4.57 | 2.21 | 1.58 | 4.45 | 4.21 |
|   | Calculated (%) | 1.79 | 1.70 | 4.95 | 4.90 | 2.20 | 1.35 | 5.24 | 4.65 |
| N | Found (%) | 0.00 | 0.00 | 0.00 | 0.00 | 0.00 | 0.00 | 0.00 | 0.00 |
|   | Calculated (%) | 0.00 | 0.00 | 0.00 | 0.00 | 0.00 | 0.00 | 0.00 | 0.00 |
| Cl | Found (%) | 0.00 | 10.69 | 0.00 | 6.67 | 0.00 | 0.00 | 0.00 | 0.00 |
|   | Calculated (%) | 0.00 | 10.07 | 0.00 | 7.05 | 0.00 | 0.00 | 0.00 | 0.00 |

TABLE 5

| Test fabric | Treatment temperature | Shower water repellency | Water repellency | Oil repellency | Shower water repellency | Water repellency | Oil repellency |
|---|---|---|---|---|---|---|---|
| | | Example 1 | | | Example 2 | | |
| Nylon | RT | 70 | 3 | 2 | 80 | 5 | 6 |
|  | 80° C. | 50 | 3 | 2 | 80 | 5 | 6 |
|  | 150° C. | 70 | 7 | 6 | 90 | 9 | 7 |
| PET | RT | 50 | 3 | 1 | 70 | 6 | 6 |
|  | 80° C. | 50 | 4 | 2 | 80 | 6 | 6 |
|  | 150° C. | 70 | 6 | 3 | 100 | 7 | 6 |
| PET/Cotton | RT | 50 | 5 | 1 | 50 | 7 | 3 |
|  | 80° C. | 50 | 7 | 1 | 70 | 8 | 4 |
|  | 150° C. | 70 | 7 | 1 | 80 | 9 | 4 |
| Cotton | RT | 50 | 9 | 4 | 50 | 7 | 3 |
|  | 80° C. | 50 | 9 | 4 | 50 | 7 | 4 |
|  | 150° C. | 50 | 9 | 5 | 50 | 8 | 5 |
| | | Example 3 | | | Example 4 | | |
| Nylon | RT | 70 | 8 | 6 | 90 | 8 | 6 |
|  | 80° C. | 80 | 9 | 6 | 100 | 10 | 6 |
|  | 150° C. | 80 | 9 | 6 | 100 | 10 | 6 |
| PET | RT | 70 | 6 | 3 | 80 | 8 | 4 |
|  | 80° C. | 70 | 6 | 4 | 90 | 8 | 5 |
|  | 150° C. | 80 | 6 | 4 | 100 | 9 | 6 |
| PET/Cotton | RT | 50 | 8 | 4 | 70 | 6 | 4 |
|  | 80° C. | 70 | 9 | 4 | 80 | 6 | 6 |
|  | 150° C. | 70 | 9 | 5 | 100 | 6 | 6 |
| Cotton | RT | 50 | 9 | 4 | 50 | 6 | 4 |
|  | 80° C. | 50 | 9 | 4 | 50 | 6 | 6 |
|  | 150° C. | 50 | 9 | 4 | 90 | 6 | 6 |
| | | Comparative Example 1 | | | Comparative Example 3 | | |
| Nylon | RT | 50 | 2 | 0 | 70 | 5 | 2 |
|  | 80° C. | 50 | 3 | 0 | 70 | 5 | 2 |
|  | 150° C. | 50 | 3 | 0 | 70 | 5 | 2 |
| PET | RT | 3 | 5 | 50 | 5 | 3 | 3 |
|  | 80° C. | 70 | 3 | 5 | 50 | 5 | 3 |
|  | 150° C. | 70 | 3 | 5 | 50 | 5 | 3 |

TABLE 5-continued

| Test fabric | Treatment temperature | Shower water repellency | Water repellency | Oil repellency | Shower water repellency | Water repellency | Oil repellency |
|---|---|---|---|---|---|---|---|
| PET/ | RT | 0 | 2 | 2 | 0 | 3 | 2 |
| Cotton | 80° C. | 0 | 2 | 2 | 0 | 3 | 2 |
|  | 150° C. | 0 | 3 | 3 | 50 | 5 | 2 |
| Cotton | RT | 0 | 0 | 3 | 0 | 2 | 2 |
|  | 80° C. | 0 | 0 | 3 | 0 | 2 | 2 |
|  | 150° C. | 0 | Fail | 4 | 0 | 6 | 2 |

TABLE 6

| | Storage stability |
|---|---|
| Example 1 | Good |
| Example 2 | Good |
| Example 3 | Good |
| Example 4 | Good |
| Comparative Example 1 | Good |
| Comparative Example 2 | Poor |
| Comparative Example 3 | Good |
| Comparative Example 4 | Poor |

TABLE 7

| | 9F-Alc/αF | 9F-Alc/αCl | 9F-Alc/AA | 17F-Alc/AA |
|---|---|---|---|---|
| Isopropyl alcohol | Good | Good | Good | Poor |
| Toluene | Good | Good | Good | Poor |
| n-Heptane | Good | Good | Good | Fair |
| Mineral spirit | Good | Good | Good | Poor |
| Methyl methacrylate | Good | Good | Good | Fair |
| Ethyl methacrylate | Good | Good | Good | Fair |
| Glycidyl methacrylate (Blemmer G) | Good | Good | Good | Poor |

TABLE 8

| Name | | 17FCA Comparative Example 5 | | | 17FClA/StA Comparative Example 6 | | | 9FClA Example 2 | | | 9FClA/StA Example 4 | | |
|---|---|---|---|---|---|---|---|---|---|---|---|---|---|
| | | Shower | | | Shower | | | Shower | | | Shower | | |
| Evaluation of Properties | Treatment temp. | water repellency | Water repellecy | Oil repellency | water repellency | Water repellecy | Oil repellency | water repellency | Water repellecy | Oil repellency | water repellency | Water repellency | Oil repellency |
| Cotton | 150° C. | 70 | 8 | 5 | 50 | 6 | 5 | 100 | 8 | 5 | 90 | 6 | 6 |

The invention claimed is:

1. A surface treatment agent, which is a polymer dispersion in water, comprising:

(1) a fluorine-containing polymer comprising:

(A) repeating units derived from a fluorine-containing monomer of the formula:

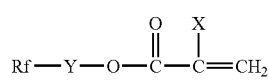
(I)

wherein X is a chlorine atom,

Y is an aliphatic group having 1 to 10 carbon atoms, an aromatic or cycloaliphatic group having 6 to 10 carbon atoms, a $-CH_2CH_2N(R^1)SO_2-$ group (wherein $R^1$ is an alkyl group having 1 to 4 carbon atoms) or a $-CH_2CH(OY^1)CH_2-$ group (wherein $Y^1$ is a hydrogen atom or an acetyl group), and Rf is a linear or branched fluoroalkyl group having 1 to 6 carbon atoms, (B) repeating units derived from a monomer free from a fluorine atom, and (C) optionally present, repeating units derived from a crosslinkable monomer;

(2) an emulsifying agent; and (3) water, wherein the concentration of the fluorine-containing polymer in the surface treatment agent, which is in the form of a solution or an emulsion, is from 0.01 to 50% by weight.

2. The surface treatment agent according to claim 1, wherein the Rf group in the repeating units (A) has 1 to 4 carbon atoms.

3. The surface treatment agent according to claim 1, wherein the Rf group in the repeating units (A) is a perfluoroalkyl group.

4. The surface treatment agent according to claim 1, wherein the fluorine atom-free monomer constituting the repeating units (B) is acrylates of the general formula:

$CH_2=CA^1COOA^2$ wherein $A^1$ is a hydrogen atom or a methyl group, and $A^2$ is a hydrocarbon group having 1 to 30 carbon atoms.

5. The surface treatment agent according to claim 1, wherein the crosslinkable monomer constituting the repeating units (C) is a fluorine-free monomer having at least two reactive groups and/or carbon-carbon double bonds.

6. The surface treatment agent according to claim 1, wherein, in the fluorine-containing polymer, the amount of the fluorine atom-free monomer is from 0.1 to 50 parts by weight, and the amount of the crosslinkable monomer is at most 20 parts by weight, based on 100 parts by weight of the fluorine-containing monomer.

7. The surface treatment agent according to claim 1, wherein the amount of the emulsifying agent is from 0.5 to 20 parts by weight based on 100 parts by weight of the monomers.

8. A method of treating a substrate with the surface treatment agent according to claim 1.

9. The method according to claim 8, wherein the substrate is a textile, a masonry, a filter, an electrostatic filter, a dust protective mask, a fuel cell, glass, paper, wood, leather, fur, asbestos, brick, cement, metal and oxide, ceramics, plastics, a coated surface or a plaster.

10. A textile which is treated with the surface treatment agent according to claim 1.

11. A carpet which is treated with the surface treatment agent according to claim 1.

* * * * *